United States Patent [19]

Dale et al.

[11] 4,357,688

[45] Nov. 2, 1982

[54] LOW COST SONOBUOY

[75] Inventors: John R. Dale, Pennsburg; Malcolm I. Dickinson, Chalfont, both of Pa.

[73] Assignee: The United States of America as represented by the Secretary of the Navy, Washington, D.C.

[21] Appl. No.: 300,875

[22] Filed: Sep. 11, 1981

[51] Int. Cl.$^{3}$ .................... H04B 1/59

[52] U.S. Cl. .................... 367/4; 367/173

[58] Field of Search .................... 367/3, 4, 173

[56] References Cited

U.S. PATENT DOCUMENTS

| | | | |
|---|---|---|---|
| 3,248,688 | 4/1966 | Shomphe | 367/4 |
| 3,251,024 | 5/1966 | Farmer | 367/4 |
| 3,277,429 | 10/1966 | Hammond, Jr. | 367/4 |
| 3,309,649 | 3/1967 | Ballard et al. | 367/4 |
| 3,397,413 | 8/1968 | Houtsma | 9/8 |
| 3,646,505 | 2/1972 | Kirby | 367/4 |

*Primary Examiner*—Richard A. Farley

*Attorney, Agent, or Firm*—R. S. Sciascia; Henry Hansen

[57] ABSTRACT

A novel low cost air-launched sonobuoy having a spherical housing of a lightweight semi-rigid foam housing encapsulated the electronic components. The housing includes recesses for receiving a hydrophone and cable pack, and for inserting D-size batteries just prior to launching. A vertical antenna is wrapped around the housing and prevents the pack from deployment until the sonobuoy is charged with the batteries and immersed in water. The free end of the antenna is released and unwraps to permit deployment of the hydrophone and cable pack. The sonobuoy is stored without the batteries in a sealed moisture-proof envelope which can be easily torn open and removed when desired.

6 Claims, 8 Drawing Figures

LOW COST SONOBUOY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to sonobuoys and more particularly to a low cost sonobuoy assembly suitable for air launching and automatic deployment upon immersion in sea water.

Air launched sonobuoys, produced in large quantities to military specifications, require long storage life, compatibility with existing ground and aircraft support equipment, and ability to withstand rough handling. The housing is usually a machined tube containing all the components mounted with standard fasteners to structural bulkheads, internal tubes and straps. O-rings seal the electronic compartments from the sea water. Some configurations employ an inflatable surface float which is initiated by a pyrotechnic device. The sonobuoys are stored in a shipping and launching container and a gray overpack. Each of these features significantly adds to the unit production costs.

SUMMARY OF THE INVENTION

Accordingly, it is an object of the present invention to provide a low cost sonobuoy which will functionally satisfy military specifications and yet be compatible with existing ground and aircraft support equipment. Another object is to provide a sonobuoy having a design configuration especially adaptable for commercially available and conventional components and packaging materials. Still another object is to provide a sonobuoy which is lightweight, capable of withstanding rough handling in normal operational use, and which may be stored indefinitely under extreme temperatures and corrosive atmospheres without deteriorating. A further object is to provide a sonobuoy having a minimum number of components many of which serve as dual functions, which can be manufactured and assembled in very large production quantities at extremely low costs, which is extremely simple to prepare for launching, and which has a high degree of reliability in operation.

Briefly, these and other objects of the invention are accomplished by a novel sonobuoy in which the transmitter and receiver components are encapsulated in spherical float of a lightweight semi-rigid foam with recesses for receiving a deployable hydrophone and cable pack assembly, a wrap-around vertical antenna, and standard size batteries. The novel sonobuoy is stored without the batteries in an air and moisture-impermeable sealed plastic envelope with a tear strip. Just prior to launching, the sonobuoy is removed from the envelope and the batteries are inserted. When the sonobuoy is air-launched at sea, the water acts as an electrical conductor for the batteries to energize a heat repsonsive clip for releasing the free end of the antenna from the sphere permitting it to unwrap and erect vertically. Unwrapping of the antenna allows the hydrophone and cable pack assembly to pay out and deploy to the desired depth.

For a better understanding of these and other objects and aspects of the invention reference is made to the following more detailed description taken in conjunction with the accompanying drawings wherein:

DESCRIPTION OF THE PREFERRED EMBODIMENT

Figure 1:
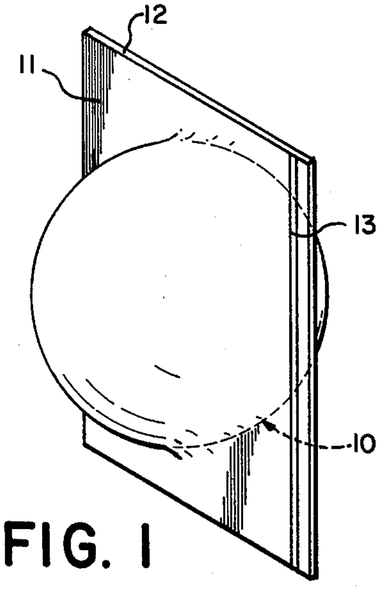
FIG. 1 represents an external view of a sealed envelope containing a sonobuoy according to the invention.
Figure 2:
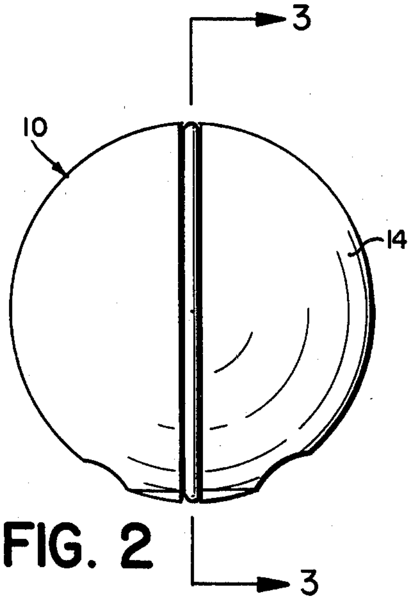
FIG. 2 represents an external view of the sonobuoy in FIG. 1 with the envelope removed.
Figure 3:
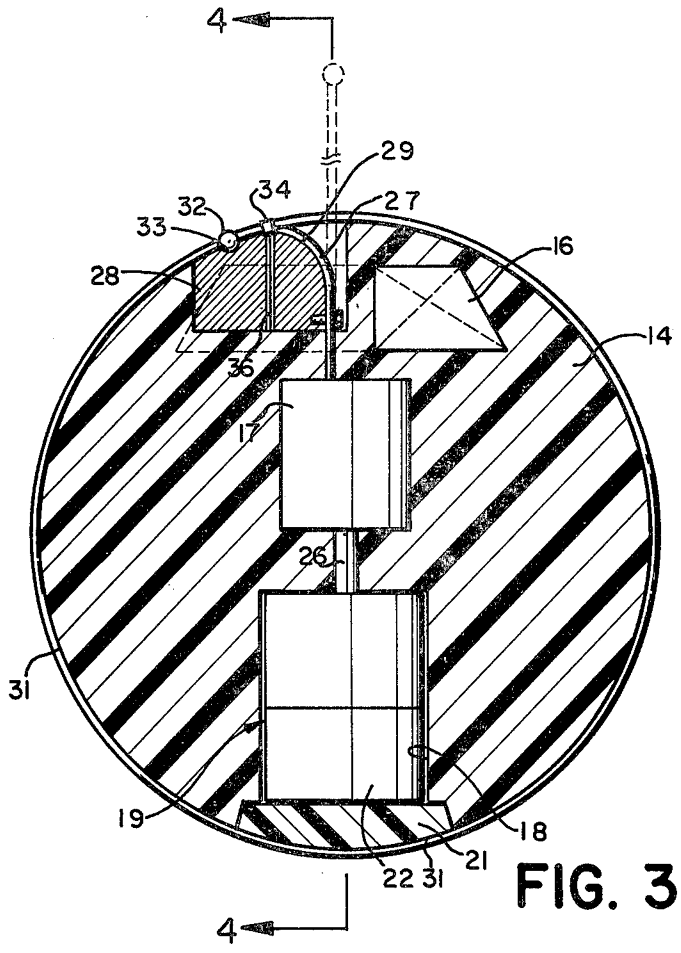
FIG. 3 is a partial cross-sectional view of the sonobuoy taken along the line 3—3 of FIG. 2.
Figure 4:
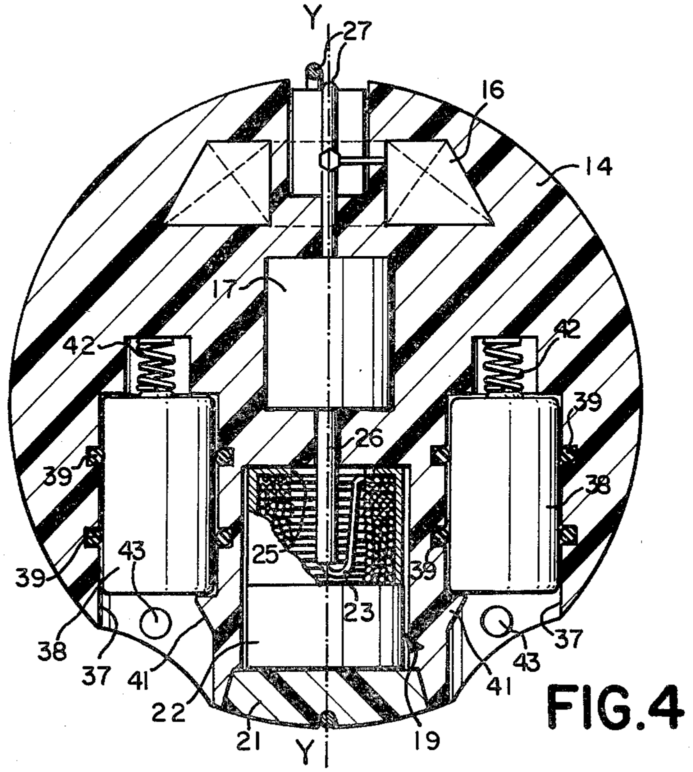
FIG. 4 is a partial cross-sectional view of the sonobuoy taken along the line of 4—4 of FIG. 3.

Referring now to the drawings wherein like characters designate like or corresponding parts throughout the several views, FIG. 1 shows a sonobuoy 10 in dotted outline sealed within a flexible air and moisture impermeable envelope 11, such as polyethylene plastic, which is sealed about its perimeter 12. A tear strip 13 along one edge provides for quick removal. As best illustrated in FIGS. 2, 3 and 4, sonobuoy 10 includes a spherical float 14 of a lightweight, semi-rigid, expanded foam which encapsulates an annularly shaped RF transmitter 16 and a cylindrical audio signal processor 17. The foam is preferably of closed cellular polyurethane structure impermeable to water and of sufficient buoyancy for the sonobuoy 10 to remain afloat indefinitely after deployment at sea. The size of the float is determined for operation in a particular sonobuoy launcher, and its spherical shape permits launching in any orientation negating air instability effects that would vary the air drag and increase placement error during launching.

Transmitter 16 is coaxially aligned above the processor 17 along an axis Y—Y passing through the center of the float. A cylindrical recess 18 is formed in float 14 below processor 17 on the axis Y—Y for housing a deployable hydrophone and cable pack assembly 19 retained therein by a circular plug 21 of the same material as the float. The plug forms an uninterrupted spherical surface with float 14. The lower portion of assembly 19 includes an omnidirectional hydrophone 22 electrically connected to processor 17 through a signal cable 23 levelwound within a canister 24. The cable length is determined by the desired operational depth of hydrophone 22. A rigid tube 26 fixed at one end to processor 17 extends through a cable payout opening 27 in canister 24 to a point along axis Y—Y substantially below the center of buoyancy of the float 14, with components contained therein, to ensure a near-vertical orientation of the Y—Y axis when the sonobuoy 10 is fully deployed in a surface wave environment.

A spring-wire vertical whip antenna 27 is secured at its base and to a light-weight insert 28, such as plastic or wood, which is also encapsulated in float 14 like transmitter 16 and processor 17. The insert includes an arcuate groove 29 approximately tangent with the axis Y—Y and the curved surface of housing 14 for guiding antenna 27 into a continuous groove 31 formed about the circumference of float 14 and plug 21 in a plane colinear with the axis Y—Y. The minimum radius of curvature of groove 29 is selected to prevent the antenna from permanent bending. Antenna 27 is a single length of insulated spring wire that terminates its active length at the transmitter 16. The free end terminates with a ball detent 32 which seats in a spherical recess 33 of insert 28 when the antenna 27 is fully contained in groove 31. The detent 32 is retained in position by a heat-responsive clip 34 which disintegrates upon applying an electrical current to a resistance wire 36. Hydrophone and cable pack assembly 19 and plug 14 are securely held in housing 14 by the antenna 27 until the latter is released by clip 34.

Figure 5:
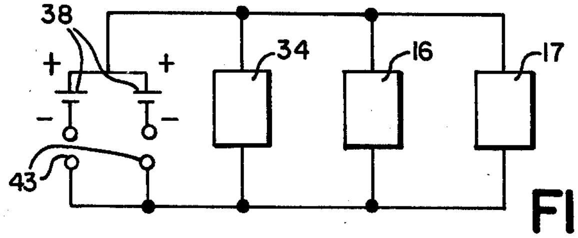
FIG. 5 is a schematic diagram of the electrical power circuit of the sonobuoy.

Float 14 also includes a pair of cylindrical recesses 37 on either side of recess 18 for inserting standard D-size batteries 38. Two ring seals 39 in each recess 18 provide a forced interference with the battery outside dimension to prevent water from reaching the positive (+) upper terminal. A sawtooth-like step 41 projects inwardly from the side of each recess 37 with a steep upper surface engaging the exposed lower end of battery 38 when fully inserted. Being of semi-elastic foam, step 41 temporarily compresses as the battery is inserted past the gradually inclined lower surface of step 41. An electrically conductive spring 42 at the upper end of each recess 37 urges the battery against the step 41 when fully inserted. A pair of electrodes 43 are encapsulated in float 14 adjacent to the negative (−) lower battery terminal with their surfaces exposed so that an electrical circuit is completed through the water when immersed in the sea. As shown in FIG. 5, completing the batteries 38-electrodes 43 circuits through the sea water energizes heat-responsive clip 34, RF transmitter 16 audio signal processor 17. Operation of the above-described sonobuoy should now be apparent and is summarized as follows. In preparation for launching, such as from in an ASW (antisubmarine warfare) aircraft, envelope 11 is torn open with tear strip 13 and the sonobuoy 10 removed. Two D-size batteries 38 are fully inserted past steps 41 with their negative terminals adjacent to electrodes 43. The sonobuoy is then placed in the launcher and ejected at the desired time.

Figure 6A:
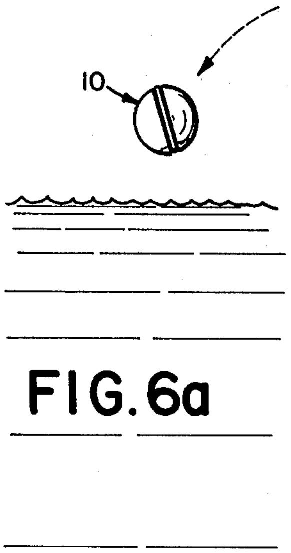
FIGS. 6*a*, 6*b* and 6*c* are elevation views of the sonobuoy in different stages of deployment at sea.
Figure 6B:
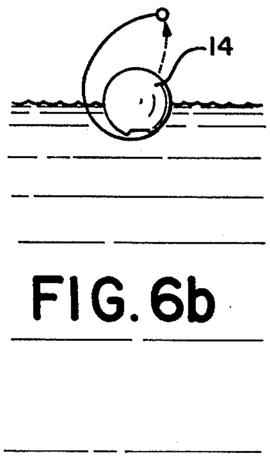
Figure 6C:
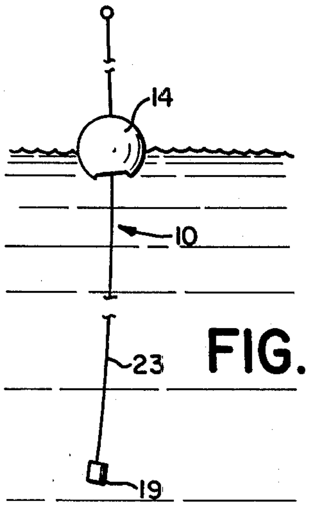

The sequence of deployment after launching is illustrated in FIGS. 6*a*, 6*b* and 6*c*. Upon contacting the water, float 14 remains on the surface and orients itself with the base of antenna 27 above the water because the heavy components (batteries 38 and hydrophone and cable pack assembly 19) are in the lower half. This also insures that the negative terminals of batteries 38 and electrodes 43 are in contact with the sea water to complete the circuits to resistance wire 36, transmitter 16 and processor 17. Heat from wire 36 causes clip 34 to separate and release the free end of antenna 27 allowing it to unwind. This in turn, releases circular plug 21 and hydrophone and cable pack assembly 19 from within float 14. Plug 21 falls free and is expended while assembly 19 deploys paying out cable 23 to the operational depth.

Some of the many advantages and novel features of the invention should now be apparent. For example, a very low cost sonobuoy is provided suitable for use in existing ground and aircraft handling and launching equipment. All components, including packaging and launch preparation, are very low in cost relative to the prior art equivalent production sonobuoys. The moisture sealed envelope permits shipping in cardboard boxes since no additional environmental protection is needed. All fragile components are encapsulated or protected by a semi-rigid resinous foam material resistant to shock and vibration. The use of standard D-size batteries provides an inexpensive power source that is not dependent on a long storage life at elevated temperatures since they are not inserted until just prior to launching. The inherent lightweight and shock resistance of the sonobuoy obviates the need for decelerators such as parachutes or rotochutes inasmuch as the air drag forces keep the free fall terminal velocity low enough to insure no damage to the components encapsulated therein. Its spherical shape permits launching in any orientation and negates the air instability effects that would otherwise vary the air drag and increase placement error. The antenna design serves a dual function of retaining the hydrophone and cable pack assembly within the float prior to deployment as well as operating as an RF antenna. Encapsulation of the components obviates any requirement for bulkheads or straps for securing them as in other sonobuoy designs.

It will be understood that various changes and details, steps and arrangement of parts, which have been herein described and illustrated in order to explain the nature of the invention, may be made by those skilled in the art within the principal scope of the invention as expressed in the appended claims.

We claim:

1. A low cost air launched sonobuoy, comprising, in combination:

spherical float means of a semi-rigid expanded foam having a first recess means extending inwardly along an axis passing through the center of said float means, and a second recess means symmetrically positioned about said first recess means extending inwardly for receiving and retaining a plurality of batteries;

hydrophone means deployably positioned within said first recess means;

plug means slidably positioned in the opening of said first recess means against said hydrophone means;

vertical antenna means fixed at the base thereof to said float means on said axis opposite from said first recess means and externally wound around said float means and said plug means in a plane co-linear with said axis;

antenna release means mounted on the surface of said float means in said plane releasably maintaining said antenna means around said float means;

electrical component means encapsulated in said float means along said axis between said first recess means and the base of said antenna means and operatively connected between said hydrophone means and said antenna means for processing and transmitting detected acoustic signals; and electrode means encapsulated in said float means having a terminal exposed at the opening of said second recess means for electrically energizing said release means and said component means when the batteries are inserted and said float means is immersed in water.

2. A sonobuoy according to claim 1 further comprising:

a flexible, moisture-proof storage envelope enclosing said float means, said envelope including a manually operable tear strip for rapid opening.

3. A sonobuoy according to claim 1 wherein said second recess means comprises:

a pair of openings on opposite sides of said first recess means, each including a laterally compressible retainer for engaging the exposed end of the battery when fully inserted and a spring at the closed end for urging the battery against said retainer.

4. A sonobuoy according to claim 1 wherein said float means and said plug means further comprises:

a continuous circumferential groove in said plane for receiving said antenna means flush with the outer surface of said float means and said plug means.

5. A sonobuoy according to claim 1 wherein said release means further comprises:

a clip responsive to heat for disengaging the free end of said antenna means; and a resistance wire operatively connected to said clip for generating heat thereto.

6. A sonobuoy according to claim 1 wherein said hydrophone means further comprises:

a spool of cable for pay out to a desired depth upon deployment from said first recess; and a hydrophone operatively connected to the extended end of said cable.

* * * * *